July 10, 1973  J. W. JONES  3,745,077
THERMIT COMPOSITION AND METHOD OF MAKING
Filed March 15, 1972
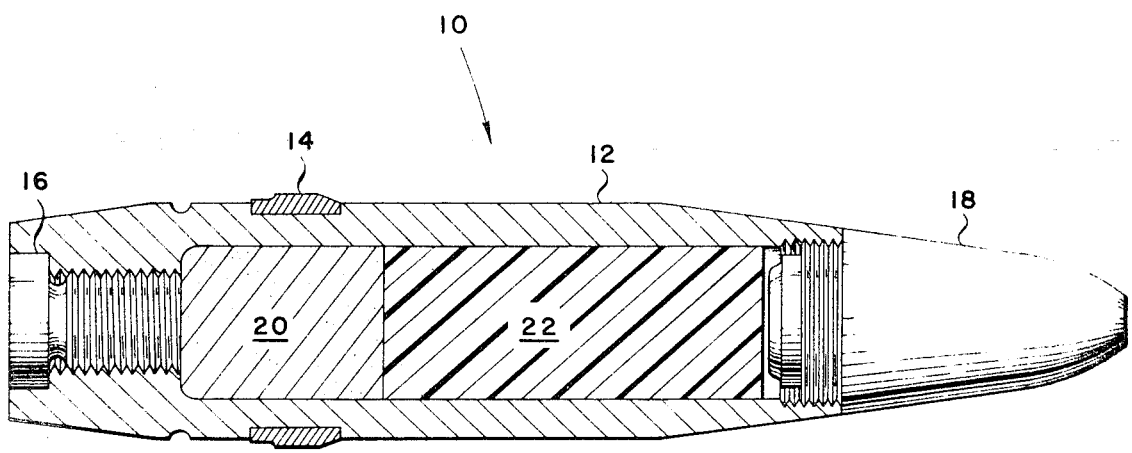

United States Patent Office 3,745,077
Patented July 10, 1973

3,745,077
THERMIT COMPOSITION AND METHOD
OF MAKING
John W. Jones, Redlands, Calif., assignor to Lockheed
Aircraft Corporation, Burbank, Calif.
Filed Mar. 15, 1972, Ser. No. 234,855
Int. Cl. C06b 15/00
U.S. Cl. 149—40                              8 Claims

ABSTRACT OF THE DISCLOSURE

A thermit composition comprising a mixture of a reducing metal and inorganic oxides wherein one of the oxides is boric oxide. The mixture is heated to a point where the boric oxide is softened and acts as a binder for the reducing metal and other oxides. Pressure is applied to the mixture to form a dense, structurally strong final product which is useful as an incendiary composition.

BACKGROUND OF THE INVENTION

Field of the invention

This invention relates to an improved incendiary thermit composition having structural strength and particularly to such a composition which is useful in incendiary bombs or projectiles.

Description of the prior art

Thermit compositions consisting essentially of a reducing metal and an inorganic oxide, such as aluminum and iron oxide, are well known. These compositions, on ignition, react to produce external heat, which is utilized in various processes and devices. Some of the uses of the thermit compositions are found in welding, metal plating, heating and in incendiary bombs.

The ingredients in thermit compositions are in powdered or granular form and therefore the mixture of these ingredients lacks strength. In the past, various materials, such as sodium silicate and kaolinite in alkaline solution, have been added to the thermit mixtures to produce a final composition which can be handled and mechanically worked. Also, some thermit mixtures have been heated to temperatures exceeding 1000° F. in order to sinter the aluminum powder contained therein and thereby give strength to the mixture. However, for various reasons, such as inadequate strength or excessive processing costs, none of these additives or processes have provided a thermit composition which is especially adapted for use in incendiary bombs or projectiles.

SUMMARY OF THE INVENTION

It is therefore an object of the present invention to provide an incendiary thermit composition with good structural properties, especially for use in incendiary bombs or projectiles.

This object is accomplished by incorporating in the usual thermit mixtures a quantity of boric oxide ($B_2O_3$), ranging from about 2% to 56% by weight. This oxide has a lower softening point than the other ingredients in the mixture. On heating of the mixture, the boric oxide is softened and acts as a binder for the other ingredients.

Boron oxide, as a binder also affords another advantage not usually found in agglomerating materials used in the past. Many of these materials are inert as far as the thermit reaction is concerned. However, the boron oxide on ignition reacts with the reducing metal to provide additional heat. A typical reaction may be represented as follows:

$$2Al + B_2O_3 \rightarrow Al_2O_3 + 2B$$

The present thermit composition comprises a mixture of a reducing metal, such as aluminum or magnesium; an inorganic oxide, such as molybdic oxide ($MoO_3$), tungstic oxide ($WO_3$), ferric oxide ($Fe_2O_3$), titanium dioxide ($TiO_2$), ferrous oxide (FeO) and ferroso-ferric oxide ($Fe_3O_4$); and a binder of boric oxide ($B_2O_3$). Aluminum is the preferred reducing metal because of its lower cost than magnesium. Generally, a combination of two or more inorganic oxides is used.

More specifically, incendiary compositions in accordance with the present invention may have the following ingredients in the weight ranges shown:

| Ingredient: | Percent by weight |
|---|---|
| Boric oxide | 10–28 |
| Aluminum powder | 28–38 |
| Inorganic oxide or oxides | 60–33 |
| Inert materials | 2–1 |

Within the limits shown, the proportions of each of the active ingredients in a given incendiary composition would be governed generally by the respective stoichiometric relationships involved. These relationships are well known, being derived from such reactions as the following:

$$2Al + Fe_2O_3 \rightarrow 2Fe + Al_2O_3$$

$$8Al + 3Fe_3O_4 \rightarrow 9Fe + 4Al_2O_3$$

The inert materials consist primarily of a lubricant such as zinc stearate.

In the production of the present compositions, the ingredients are mixed in powdered form and then heated to temperatures of about 300° F. to about 900° F. The boric oxide is softened at these temperatures and, on cooling, binds the reducing metals and oxides into a dense, structurally strong product. Simultaneously or prior to the heating step, the mixtures are also compressed or compacted in an appropriate mold at pressures up to 50,000 pounds per square inch, depending upon the final density, porosity and shape of the final composition desired. The preferred heating range is from 700° F. to 900° F. and the preferred compaction pressures are from 5,000 to 25,000 pounds per square inch.

The final products have densities ranging from about 1.7 to about 2.7 grams per cubic centimeter (0.0614 to 0.0975 pound per cubic inch) and tensile strengths of 1,000 to 2,500 pounds per square inch.

BRIEF DESCRIPTION OF THE DRAWING

The drawing shows a cross-sectional view of a typical incendiary projectile showing a quantity of the present incendiary composition contained therein.

DESCRIPTION OF THE PREFERRED EMBODIMENTS

The present incendiary compositions can be described in greater detail in relation to the accompanying drawing. Projectile 10 comprises a steel casing 12 with a gilding metal rotating band 14 with a screw-in steel base closure 16 and an impact fuze 18 (not shown in section). These components are conventional parts of a typical gun projectile and are well known in the arts of gunnery and ordnance. Present incendiary composition 20, which may have any one of the compositions described in the specific examples following, is compounded and placed in the projectile cavity adjacent the closure 16. The composition is then heated and compacted in the manner described in the specific examples. High explosive material 22, such as trinitrotoluene, is then pressed on top of the incendiary composition and a fuze 18 is installed. The finished projectile is fired from a gun by means well known in the ordnance art. Upon striking a target, fuze 18 is activated, causing the explosive 22 to detonate. This detonation fragments the metal casing 12 and the compacted block of incendiary composition 20 and disperses the pieces near the target. The shock of the explosion and its associated heat initiates the exothermic reaction of the incendiary composition and sets fire to combustibles in the target area. The dispersed pieces may be effective for periods up to one minute in setting fires. It will be apparent that the solid mass provided by the present compositions, which is fragmented and dispersed in chunks, is more effective for incendiary purposes than a loosely held mass of ingredients, which would be dispersed in powdered or granular form.

The following three examples show preferred compositions for use in incendiary bombs or projectiles and methods of fabricating these compositions.

EXAMPLE 1

A thermit composition was prepared by mixing 28.1 parts by weight of aluminum powder, 12.8 parts by weight of boric oxide, 57.8 parts by weight of mixed oxides of iron and 1.3 parts by weight of an inert material. The mixed oxides of iron included ferric oxide ($Fe_2O_3$), ferrous oxide (FeO) and ferroso-ferric oxide ($Fe_3O_4$). The inert material consisted primarily of a lubricant such as zinc stearate. The composition was compacted in a die of suitable shape at an applied pressure of 15,000 pounds per square inch and subsequently heated for one hour at a temperature of 840° F. to provide a solid mass.

This composition had the following properties:

| | |
|---|---|
| Density (lbs./in.$^3$) | 0.096 |
| Tensile strength (p.s.i.) | 2400 |
| Theoretical reaction temperature (° F.) | 3860 |
| Theoretical exotherm (calories/gm.) | 820 |
| Linear reaction rate (in./sec.) | 0.18 |
| Autoignition temperature (° F.) | >1400 |

EXAMPLE 2

A thermit composition was prepared by mixing 37.5 parts by weight of aluminum powder, 33.5 parts by weight of titanium dioxide, 28.0 parts by weight of boric oxide and 1.2 parts by weight of an inert material. The inert material consisted primarily of a lubricant such as zinc stearate. The mixture was compressed in a suitable die at a pressure of 5,000 pounds per square inch and the compacted shape subsequently heated for one hour at a temperature of 750° F.

This composition had the following properties:

| | |
|---|---|
| Density (lbs./in.$^3$) | 0.063 |
| Tensile strength (p.s.i.) | 2,000 |
| Theoretical reaction temperature (° F.) | 3,000 |
| Theoretical exotherm (calories/gm.) | 920 |
| Linear reaction rate (in./sec.) | 0.09 |
| Autoignition temperature (° F.) | >1400 |

The above incendiary composition differs from that described in Example 1 in that its density is low and its linear reaction rate is low. These differences cause it to be more desirable for use in certain types of projectiles where density is an important consideration of the design.

EXAMPLE 3

A thermit composition was prepared by mixing 29.3 parts by weight of aluminum powder, 10.0 parts by weight of boric oxide, 58.3 parts by weight of mixed oxides of tungsten and molybdenum, and 2.4 parts by weight of an inert material. The mixed oxides of tungsten and molybdenum were typically in the ratio of 90 parts by weight of molybdenum trioxide ($MoO_3$) to 10 parts by weight of tungsten trioxide ($WO_3$). The inert material consisted primarily of a lubricant such as zinc stearate.

The mixed materials were compacted at a pressure of 10,000 pounds per square inch in a die of suitable shape. The compacted composition was then heated at 500° F. to 800° F. for one hour.

This composition had the following properties:

| | |
|---|---|
| Density (lbs./in.$^3$) | 0.08 |
| Tensile strength (pounds per square in.) | 1,000 |
| Theoretical reaction temperature (° F.) | 3,300 |
| Theoretical exotherm (calories/gm.) | 1,000 |
| Linear reaction rate (in./sec.) | 0.30 |
| Autoignition temperature (° F.) | >1400 |

The high burn rate of this composition, in contrast to those shown in Examples 1 and 2, favors a more rapid, intense heat release on target combustible material.

Although the above description of the present compositions is largely in terms of their usage in incendiary projectiles, there is no intention that these compositions be limited to such usage. Other variations and modifications will be apparent to those skilled in the art, and the scope of the present invention will be as defined in the appended claims.

I claim:

1. A method of compounding a thermit composition comprising: providing a reducing metal selected from the group consisting of aluminum and magnesium; at least one inorganic oxide selected from the group consisting of molybdic oxide, tungstic oxide, ferric oxide, titanium dioxide, ferrous oxide, and ferroso-ferric oxide; the metal and oxide being present in approximate stoichiometric relationship; and about 2% to 56% by weight of boric oxide; mixing the reducing metal, inorganic oxide, and boric oxide; heating the mixture at temperatures ranging from 300° F. to 900° F.; and compacting the mixture at pressures up to 50,000 pounds per square inch.

2. A method according to claim 1, comprising: providing about 28% by weight of aluminum powder, about 13% of boric oxide, about 58% of mixed oxides of iron and about 1% of inert materials; mixing said ingredients; compacting said mixture at pressures ranging from 5,000 to 25,000 pounds per square inch; and heating said mixture at temperatures ranging fro 700° F. to 900° F.

3. A method according to claim 1, comprising: providing about 38% by weight of aluminum powder, about 33% of titanium dioxide, about 28% of boric oxide, and about 1% of inert materials; mixing said ingredients; compacting said mixture at pressures ranging from 5,000 to 25,000 pounds per square inch; and heating said mixture at temperature ranging from 700° F. to 900° F.

4. A method according to claim 1, comprising: providing about 29% by weight of aluminum powder, about 10% of boric oxide, about 50% of molybdic oxide, about 8% of tungstic oxide, and about 3% of inert materials; mixing said ingredients; compacting said mixture at pressures ranging from 5,000 to 25,000 pounds per square inch; and heating said mixture at temperatures ranging from 700° F. to 900° F.

5. A method according to claim 1, wherein about 10% to about 28% by weight of boric oxide is provided.

6. A method of compounding a thermit composition comprising: providing about 10% to about 28% by weight of boric oxide, about 28% to about 38% of aluminum powder, about 33% to about 60% of at least one inorganic oxide and about 1% to about 2% of a lubricant; mixing the boric oxide, aluminum powder, inorganic oxide, and lubricant; heating the mixture formed at temperatures ranging from 300° F. to 900° F.; and compacting the mixture at pressures up to 25,000 pounds per square inch.

7. A thermit composition comprising: a reducing metal selected from the group consisting of aluminum and magnesium; at least one inorganic oxide selected from the group consisting of molybdic oxide, tungstic oxide, titanium dioxide, ferric oxide, ferrous oxide, and ferroso-ferric oxide; the metal and oxide being present in approximate stoichiometric relationship; and about 10% to about 28% by weight of boric oxide.

8. A thermit composition comprising: about 10% to 28% by weight of boric oxide; about 28% to about 38% of aluminum powder; about 33% to about 60% of at least one inorganic oxide; and about 1% to about 2% of a lubricant.

References Cited

UNITED STATES PATENTS

| | | | |
|---|---|---|---|
| 3,050,409 | 8/1962 | Bayer | 149—37 X |
| 3,254,996 | 6/1966 | MacDonald | 149—37 X |
| 3,297,503 | 1/1967 | Hoffmann et al. | 149—37 X |
| 3,344,210 | 9/1967 | Silvia | 149—37 X |

STEPHEN J. LECHERT, JR., Primary Examiner

U.S. Cl. X.R.

149—17, 44; 264—3 R; 44—3 R, 3 C; 148—24, 26